May 27, 1930.   N. TRBOJEVICH   1,759,968
WORM GEARING
Filed May 19, 1924    3 Sheets-Sheet 1
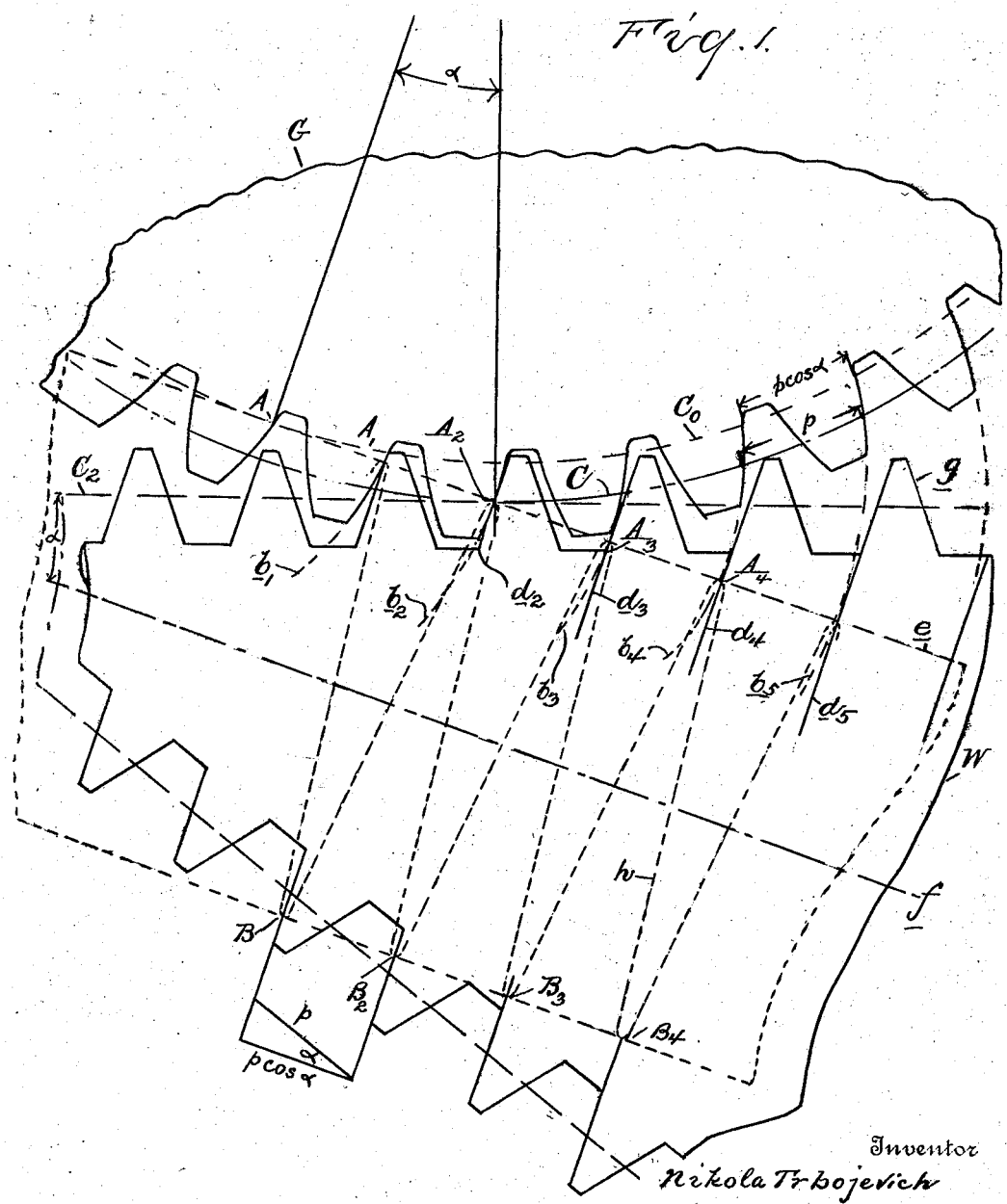
Inventor
Nikola Trbojevich
By Whittemore Hulbert Whittemore
+Belknap   Attorneys May 27, 1930.  N. TRBOJEVICH  1,759,968
WORM GEARING
Filed May 19, 1924   3 Sheets-Sheet 2
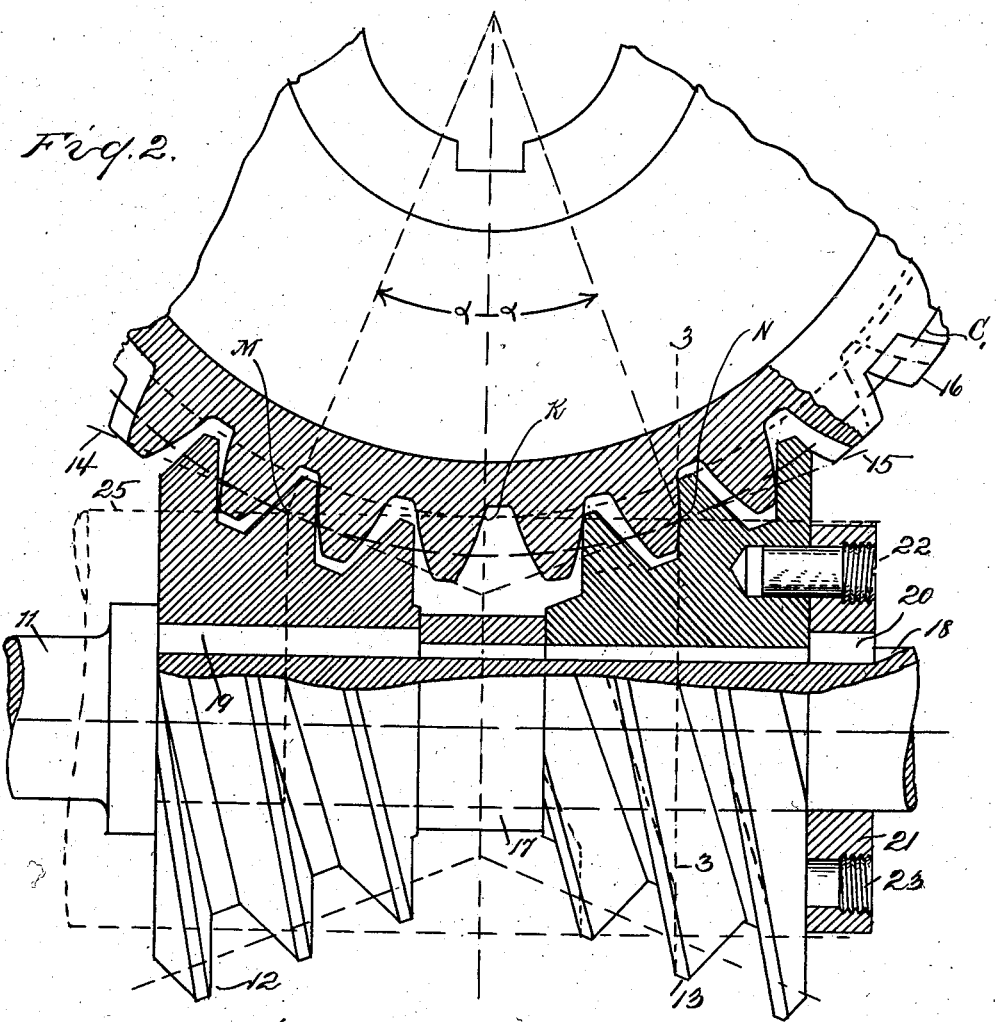
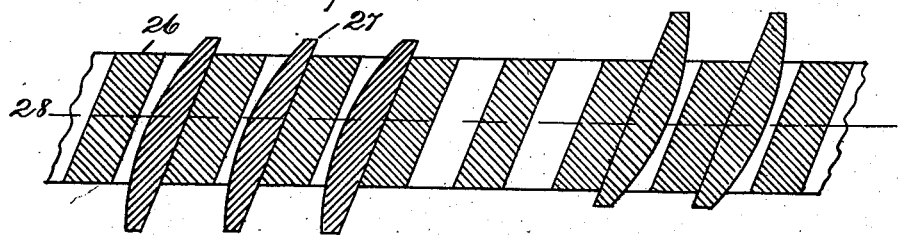
Inventor
Nikola Trbojevich
By Whittemore Hulbert Whittemore
+Belknap   Attorneys

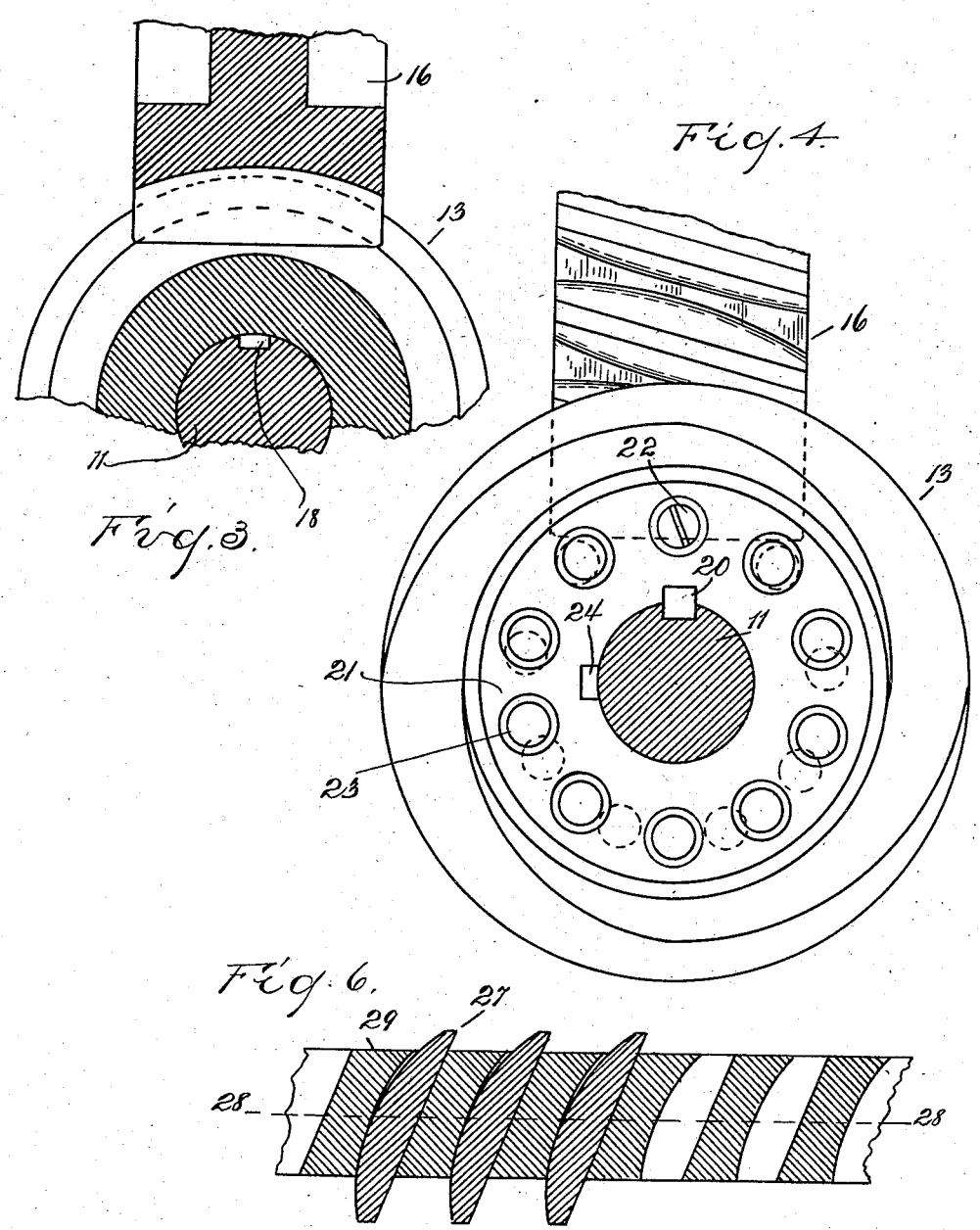

Patented May 27, 1930

1,759,968

UNITED STATES PATENT OFFICE

NIKOLA TRBOJEVICH, OF DETROIT, MICHIGAN, ASSIGNOR TO GLEASON WORKS, OF ROCHESTER, NEW YORK, A CORPORATION OF NEW YORK

WORM GEARING

Application filed May 19, 1924. Serial No. 714,445.

The invention relates to a worm drive of a novel kind in which a novel cylindrical or spur worm gear meshes with one or more conical worms of constant lead. The new arrangement possesses some particular practical and theoretical advantages over the common form of worm drive (in which the driving worm is cylindrical), among which may be mentioned: (1) a more correct engagement, (2) a possibility of employing two worms instead of one to mesh with the same gear, (3) a possibility of adjusting the backlash without changing the center distance, (4) a slight variation of center distance is also permissible, and (5) the applicability of the system to a simple and accurate method of mass production.

In generating the new worm gears one or two conical hobs of constant pitch may be used. The conical hobs are similar to the conical hobs which I first employed for generation of spiral bevel gears of the modified involute type (see my prior Patent Number 1,465,151 issued August 14, 1923,) and they are turned bored, gashed, relieved, hardened, and ground in the same manner as those previously described. The new worm drive is based upon a new theory of involute spur gearing which to my knowledge I was the first to discover and which underlies the methods of generating gears described in my co-pending applications for patent Ser. No. 647,670, filed June 25, 1923, and Ser. No. 701,527, filed March 24, 1924, the first relating to a method of gear generating by means of large conical hobs having less than one full convolution of helix, and the second to a method of employing double conical hobs with several convolutions of helix.

In the drawings:

Figs. 1, 5, and 6 are geometrical diagrams explaining the theory of the new drive.

Fig. 2 is an elevation of the improved worm drive shown partly in section.

Fig. 3 is a section thereof on the line 3—3 of Fig. 2.

Fig. 4 is the side view of said worm drive.

Figure 5 illustrates diagrammatically the plane development of the pitch cylinder $C_1$ of the gear shown in Figure 2, this gear being designed to mesh with two conical worms;

Figure 6 is a similar plane development of a gear designed for meshing with a single conical worm.

My new theory of involute gearing according to which spur involute surfaces may generally be considered as the envelopes of conical screws, is illustrated in Fig. 1. Let G be the central section or lamina of an involute worm or helical gear, and W the axial section of a conical screw. The screw is so designed that it may correctly mesh with the lamina G with the sides of the screw thread lying nearest to the cone apex, and to accomplish this it has an axial rack section $g$ having the same pitch or spacing $p$ as the lamina to be generated, the same pressure angle $\alpha$, and a cone angle also equal to $\alpha$. The two elements are so arranged in the plane of paper that the pitch circle C, of the lamina G touches the pitch cone $C_2$ of the screw W at the point $A_2$ at which point the involute $b_2$ drawn from the base circle $C_0$ of the lamina is tangent to the side of the rack tooth $d_2$, and also the involute tooth-surface of the lamina (of which $b_2$ is only a plane section) is tangent to the conical helicoid $d_2$. In other words, the assumption is that the helix angle of the lamina G is complementary to the helix angle of the worm W at $A_2$, and the two tangent planes, one drawn to the gear, and the other to the screw at the point $A_2$, coincide.

If that be so, it is easily proved that also the points A, $A_1$, $A_3$, $A_4$, etc. all lying on the straight line $e$ (the so called line of action), are points of mutual tangency of the involute lamina G with the conical helicoid W, and that the common tangent planes to said two elements at those points are all equispaced and parallel to the first tangent plane passing through the pitch point $A_2$. To prove this we must first recall a few fundamental properties of the involute spur gearing. As it is well known the involutes $b_1$, $b_2$, $b_3$, etc. are all equispaced and parallel, and also all intersect the line of action at $e$ right angles at the points $A_1$, $A_2$ $A_3$ etc. In particular, the spacing $$A_1A_2 = A_2A_3 = A_3A_4 = p \cos \alpha$$

where $p$ is the circular pitch of the gear teeth end and $\alpha$ the pressure angle. Now, the tangent planes to the gear drawn at $A_1$ $A_2$ etc. must all be parallel, because if they were not, the gear G would not correctly mesh with an involute rack, which rack consists of a series of parallel and equi-distant planes and the gear G thus would not be an involute gear. Thus, the first part of the proof is already evident, that is, the series of tangent planes to the gear drawn at the points $A_1$ $A_2$ $A_3$ etc. are equi-distant and parallel.

The conical screw W is generated by a straight line $d_2$ when said line moves parallel to itself with a uniform velocity along the side of the pitch cone $C_2$ while the cone is uniformly rotated about its axis $f$. From this follows that the sides of the screw threads $d_1$ $d_2$ $d_3$ being equally spaced along the side of the cone with a spacing $p$ are also equally spaced along the line $e$, said line being parallel to the axis $f$ of the screw, and the spacing is equal to $p \cos \alpha$. Furthermore, the points $A_1$ $A_2$ $A_3$ etc. lie on a circular helix $h$ concentric with the axis of the screw. Because, according to the supposition, the cone angle of the screw is equal to the pressure angle of the gear, and the line $e$ describes a cylinder (the base cylinder) about the axis $f$ when said axis is rotated. On the other hand, the points $A_1$ $A_2$ $A_3$ etc. also move with a uniform velocity along the line $e$, thus describing the circular helix or helixes $h$ (depending on the number of threads in the screw) relative to the conical screw W. Therefore, when the lamina G and the screw W are rotated in the timed relation, the helix $h$ will envelop the involutes $b_1$ $b_2$ $b_3$ etc. and the conical helicoid taken as a surface will also envelop and generate the involute helicoids or teeth of the gear. This theorem may be still further broadened as it is possible now to prove that the involute helicoids $b_1$ $b_2$ etc. may be correctly generated even in the case when the axis $f$ of the worm is not in the plane of paper but is inclined with respect to the axis of gear to an acute angle. In that case, however, in addition to the timed rotation of the gear and screw a relative feed movement, or a movement of translation must be imparted to the screw, said movement being in a direction parallel to the axis of gear, the same as in common hobbing.

Thus, I have discovered a new hobbing process by which involute spur gears having straight, helical or worm teeth may be correctly generated without mutilation of the tooth surfaces. Such is not the case with the spur hobs now used as there the pitch surface of the hob being cylindrical, the line of action $e$ must necessarily lie on the surface of a cone and the helix $A_1$ $B_1$ $A_2$ $B_2$ etc. becomes a conical helix having a variable helix angle and a variable angle of inclination of the tangent planes with respect to the axis of hob, resulting in a slight mutilation of the gear tooth surfaces.

Another advantage of the conical screw is that the sides of the screw thread facing the cone apex are very flat and approximate their tangent planes intimately thus producing an effect similar to that when the gear is meshing with a plane rack, that is, producing a maximum area and duration of engagement. It should be noted, however, that the engagement is correct only upon the sides of the screw thread facing the cone apex, while the opposite sides of the screw thread (lying farthest from the apex) exhibit very much the same properties as do the common spur hobs and worms. This feature is practically unimportant, however, because first, in most cases the gear is running always or predominantly in the same direction in which case the accurately finished sides of the teeth ($b_1$ $b_2$ etc. Fig. 1) may be used for transmission of rotation, and second, two conical worms may be mounted upon the worm arbor, each worm meshing only with one side of the thread, preferably the correct side.

An elevation of the improved worm drive is shown in Fig. 2. Upon the worm arbor 11 two conical worms 12 and 13 are mounted in such a manner that their corresponding pitch lines 14 and 15 contact with the pitch circle $C_1$ of the gear 16 at the points M and N. A spacer 17 separates the smaller ends of the worms 12 and 13 from each other in such a manner that the points of contact M and N will lie substantially in the middle of said worms.

A keyway 18 is cut over the whole length of the worm arbor holding the keys 19 and 20, the first preventing the worm 12 from turning with respect to the arbor 11 and the second serving as a driving means for the drive collar 21 adjacent to the worm 13, and driving the latter by means of a pin 22. The worm 13 is therefore not directly keyed to the arbor 11, and by releasing the pin 22, it may be rotated about said arbor and the amount of back-lash or play between the worms 12 and 13, and the gear 16 thus accurately adjusted. As shown in Fig. 4, the drive collar 21 is provided with ten threaded holes 23 while in the side of worm 13 only 9 holes are drilled. In addition there is an additional keyway 24 spaced at right angles from the key 20, cut in the collar. By this arrangement the worm 13 may be keyed in 9×10×2=180 different positions relative to the gear 16. This number of possible adjustments is usually sufficient for practical purposes and a still finer adjustment is obtainable by slightly varying the width of the spacer 17. This particular method of adjusting the bearing of the worms against the gear is not necessarily essential and in fact, the new drive would correctly operate in the spirit of this invention even if the two worms 12 and 13 were manufactured integral with the shaft 11.

Referring now again to the principle of engagement it is seen from Fig. 2 that the worm 13 engages the gear 16 in substantially the same manner as does the screw W the lamina G in Fig. 1. The worm 12 also acts in a similar manner, because if we first look upon the worm 13 and make a metal picture of the geometrical configuration and then look at the worm 12 from behind the sheet of paper, the two images will be found to be identical. As both worms possess the same lead and hand of helix, the same cone and pressure angles, and as further they are symmetrically disposed relative to the gear 16, it follows that the pitch points M and N are at the same distance from the axis $f$, and the cylinder 25 is the common base cylinder to both worms. Also said cylinder 25 is tangent to the base cylinder $C_0$ of the gear at the point K. Therefore, when the arbor 11 is rotated the two rack elements of the worms 12 and 13 will move in the directions of the tangents 14 and 15 drawn to the pitch circle $C_1$ of the gear at the points M and N. Similarly, the line of contact M N will move tangentially with respect to the base circle $C_0$, the point of tangency being at K. It is evident now that the pitch circle $C_1$ of the gear will roll together without slipping with the imaginary rack pitch lines 14 and 15, and the base circle $C_0$ will roll without slipping with the line M N, as the spacing of the teeth is equal to $p$ in the first case, and to $p \cos \alpha$ in the latter case, thus corresponding to the spacing of the two conical worms.

Relative to the cone angle of the worms it should be noted that theoretically the cone angle of the worm should be equal to the pressure angle of gear. In practice, however, I have found it necessary to make the cone angle of the worm slightly less than $\alpha$. This is necessary to do in order to avoid interference of the gear teeth with the hob when the hob is being fed into the worm gear, as otherwise certain portions of the gear teeth would be mutilated before the hob was fully fed into the depth of cut. Thus if the pressure angle of the gear is 20 degrees I usually employ worms and hobs having a cone angle of only 19 degrees.

The teeth 26 of the gear in outward appearance are somewhat similar to those of a common worm gear inasmuch as they are deeper in the middle and shallower near the sides of the gear, and the bottoms of interdental spaces are approximately circular and hollow. However, the nature of contact is entirely different, because the lines of contact between the screw thread and the gear teeth are substantially parallel to the axis of the gear, whereas in the conventional worm drive they form an acute angle with respect to said axis. Further, the teeth, although helical, are substantially of the same thickness over the whole face of the gear while in the ordinary worm gears they have an hour glass cross section (thin in the middle.) These conditions are also diagrammatically illustrated in Figs. 5 and 6, the former representing the plane development of the pitch cylinder $C_1$ of the new gear when generated to mesh with two conical worms, and Fig. 6, showing a development capable of meshing with only one conical worm. As seen in Fig. 5 the teeth 26 are helically inclined with respect to the pitch line 28 and are substantially of the same thickness in their entire lengths. The portions of screw threads 27 engaging the gear teeth have a circular segmental shape and contact with teeth 26 upon their flat sides, that is, the sides of thread facing the cone apex, while the opposite or convex sides of thread do not touch the teeth 26 at all.

In Fig. 6 the teeth 29 are generated with only one conical worm or hob. As already stated this arrangement may be used if the worm is always running in the same direction and if no adjustment such as shown in Figs. 2 and 4 is required. The teeth 29 of the worm gear are non-symmetrical in their pitch line section being flat or ruled on one side, and concave and curved on the other. In this case the worm thread 29 is usually made of sufficient thickness so as to completely fill out the interdental spaces along the pitch line 28.

In hobbing the new worm gears a common hobbing machine may be used and the tapered hobs (mounted upon the hob arbor in exactly the same relation as shown in Fig. 2) are rotated in a timed relation with the gear blank and gradually fed into the gear blank until the proper depth of teeth is reached. If it is not desired to employ two hobs, the same gear may be hobbed with only one hob. In that case the hob is first placed on one side of the arbor, say, in position occupied by the worm 12 in Fig. 2, and the teeth generated on one side after which the hob may be placed in the place of the worm 13 and the process repeated. Or otherwise, the hob may be left in its original position and the blank 16 reversed on its arbor and the teeth so completed.

The manufacture of the tapered worms also may be accomplished in many different ways. They may be milled in the well known milling machine, or hobbed in my spiral bevel gear hobber with tapered hobs, or with crown hobs of the modified involute type as described in my co-opending application Serial No. 684,862, filed January 2, 1924. The worms also may be burnished, lapped or ground in the thread similar to the common or spur worms.

What I claim as my invention is:—

1. A worm drive consisting of two frusto-conical screws the threads of which form a rack of constant pitch in the axial plane section and an Archimedean spiral in their plane development arranged upon the same axis with their small ends adjacent, and a conjugate worm gear simultaneously meshing with both screws.

2. A worm drive consisting of two frusto-conical screws, the threads of which form a rack of constant pitch in their axial plane section and an Archimedean spiral in their plane development arranged upon the same axis with their smaller ends adjacent, and a conjugate worm gear capable of simultaneously meshing with both screws when the axes of the screws and gear are disposed at right angles.

3. A worm drive consisting of a conical screw, the thread of which forms a rack of constant pitch in the axial section and an Archimedean spiral in plane development, and a conjugate worm gear operating at a fixed center distance, the axis of said screw and gear being arranged at right angles.

4. A worm drive consisting of two frusto-conical screws arranged upon the same axis with their smaller ends adjacent, and a conjugate worm gear, the arrangement being such that one screw contacts with one side of each gear tooth once during each revolution of gear, and the other screw contacts with the opposite sides of teeth.

5. A worm drive consisting of two frusto-conical screws mounted upon a rotary arbor with their smaller ends adjacent, a conjugate worm gear having an axis disposed at right angles with respect to said rotary arbor and a central plane lying in the same plane with said arbor.

6. A worm drive consisting of two frusto-conical screws mounted upon a rotary arbor with their smaller ends adjacent, a conjugate worm gear having an axis disposed at right angles with respect to said rotary arbor and a central plane lying in the same plane with said arbor, and means for rotatively and longitudinally adjusting the screws with respect to gear to eliminate backlash.

7. A worm drive consisting of a conical screw of constant pitch and a conjugate worm gear operating at a fixed center distance, the axis of said gear and screw being arranged at right angles, and means for adjusting the screw along its axis until both sides of the thread contact with the corresponding sides of the worm teeth.

8. A worm gear having a cylindrical body and a plurality of equi-spaced teeth thereon, said teeth being substantially flat on both sides and being capable of meshing simultaneously with two conical screws arranged coaxially with their smaller ends adjacent, said flat surfaces forming a geometrical envelope to the corresponding surfaces of the screw threads lying nearest to their corresponding cone apexes.

9. A pair of mating gears consisting of a conical screw of constant pitch, having an axial rack section and a large radius of curvature on the side of the thread facing the cone apex, and a small radius on the side farthest from the apex, and a worm gear having the same pitch and pressure angle as the rack section of the screw, the two elements engaging each other in such a manner that the axis of the screw lies in the central plane of the gear and at right angles to the axis thereof, and the pitch cone of the screw contacts with the pitch cylinder of the gear at a point offset from the shortest distance connecting the two axes toward the large end of the worm so that upon each revolution of the screw the gear rotates through an angle obtained by developing the length of the lead of the conical helix upon the pitch circle of the gear.

10. A worm drive comprising a tapered worm, the teeth of which form in axial section a rack of constant pitch, and a conjugate worm gear meshing therewith and provided with helically arranged teeth.

11. A worm drive comprising a pair of coaxially mounted tapered worms having conical pitch surfaces and a conjugate worm wheel having a cylindrical body and a plurality of helically arranged equi-spaced teeth, said worms being so meshed with the worm wheel that their smaller ends are adjacent and are spaced axially from each other.

12. A worm drive comprising a conical worm of constant pitch along a straight line generatrix of the pitch surface of the worm and worm wheel having a cylindrical body and a plurality of helically arranged equi-spaced teeth, said teeth being substantially flat on one side.

13. A worm drive comprising a conical worm and a conjugate worm wheel having a cylindrical body and a plurality of helically arranged equi-spaced teeth, said worm being so positioned relative to the worm wheel that it lies wholly on one side of a line perpendicular to the axes of worm and wheel.

14. A worm drive comprising a conical worm and a conjugate worm wheel having a cylindrical body and a plurality of helically arranged equi-spaced teeth which are substantially flat on one side, said worm being so positioned relative to the gear that it lies wholly on one side of a line perpendicular to the axes of worm and gear.

15. A worm drive comprising a conical worm of constant pitch and conjugate worm wheel having a cylindrical body and a plurality of helically arranged equi-spaced teeth which are substantially flat on one side, said worm being so positioned relative to the wheel that it lies wholly on one side of a line perpendicular to the axes of worm and wheel.

16. A worm drive comprising a pair of coaxially mounted conical worms and a worm wheel having a cylindrical body and a plurality of helically arranged equi-spaced teeth which are substantially flat on both sides, said worms being so meshed with the wheel that their smaller ends are adjacent and are spaced axially from each other.

17. A worm drive comprising a pair of coaxially mounted conical worms of constant pitch and a worm wheel having a cylindrical body and a plurality of helically arranged equi-spaced teeth which are substantially flat on both sides, said worms being so meshed with the wheel that their smaller ends are adjacent and are spaced axially from each other.

In testimony whereof I affix my signature.

NIKOLA TRBOJEVICH.